Nov. 15, 1955        P. W. REYNOLDS ET AL        2,723,997
SEPARATION OF CATALYSTS FROM LIQUID PRODUCTS
Filed Dec. 28, 1949
FIG. 1.
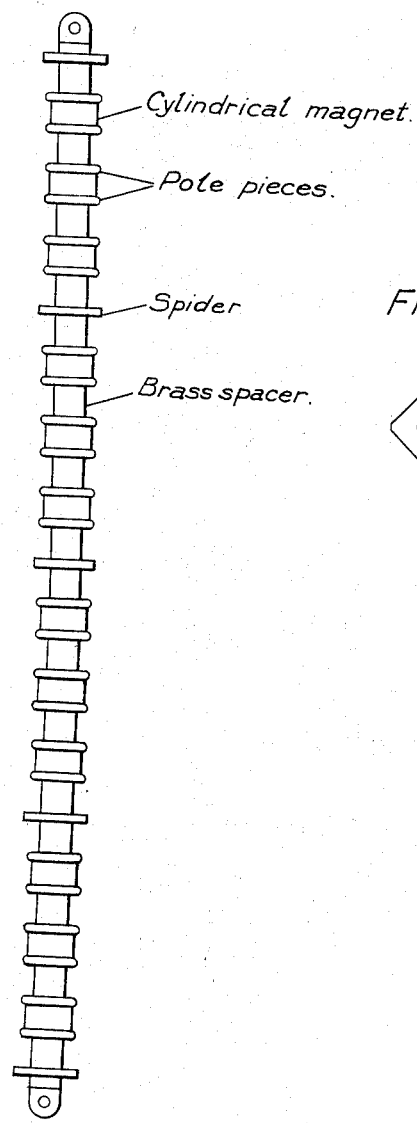
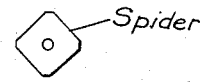
FIG 2.
Inventors:
Peter William Reynolds,
Sidney Arthur Lamb,
By Cushman, Darby & Cushman
Attorneys.

United States Patent Office 2,723,997
Patented Nov. 15, 1955

2,723,997

SEPARATION OF CATALYSTS FROM LIQUID PRODUCTS

Peter William Reynolds and Sidney Arthur Lamb, Norton-on-Tees, England, assignors to Imperial Chemical Industries Limited, a corporation of Great Britain Application December 28, 1949, Serial No. 135,332

Claims priority, application Great Britain January 24, 1949

1 Claim. (Cl. 260—604)

This invention relates to the separation of cobalt, nickel or iron from liquid reaction products in which they are present in soluble form.

It is known to employ cobalt, nickel or iron as catalysts for reactions of carbon monoxide with organic compounds under superatmospheric pressure, and it is also known that the products of such reactions contain dissolved compounds of the catalytic metals, possibly as carbonyls.

In co-pending United States application Serial No. 120,609, filed October 10, 1949, now abandoned, it is disclosed that the catalytic metals may be precipitated from such reaction products by treatment with hydrogen. Subsequently the resulting precipitate may be filtered off from the liquid by means of a filter bed of, for example, pumice, diatomaceous earth, or by means of a ceramic filter.

According to the present invention there is provided, in chemical processes operated at superatmospheric pressure and in the liquid phase, in which there are present in the reaction product one or more compounds of the ferromagnetic metals with carbon monoxide or with carbon monoxide and hydrogen and said product is under a pressure of carbon monoxide, a method for reducing the concentration of catalytic metal in the reaction product which comprises reducing the partial pressure of carbon monoxide over the latter whereby metal is precipitated and separating precipitated metal from the liquid by subjecting it to the effect of a magnetic field. It is particularly convenient to operate the process in the carbonylation of olefines—especially aliphatic monoolefines containing from 2 to 12 carbon atoms in the molecule—to oxygenated compounds, especially using a metal carbonyl as catalyst.

The magnetic field may be applied, for example by permanent or electromagnets and a series of fields of progressively increasing intensity can be arranged and the liquid passed through them. One suitable arrangement is to have a vessel fitted with a series of trays or frames in which are placed permanent magnets, it being arranged that the number of magnets per tray or frame increases progressively in the direction of flow of the liquid, which may be upwardly, downwardly or horizontally through the vessel. Alternatively the field strength may be increased by using progressively stronger magnets. As the liquid passes through the series the amount of metal in suspension is reduced by deposition on the magnets, and by arranging to have a sufficiently large number of magnets in the last few trays, practically all of the precipitated metal can be removed from the liquid.

Alternatively magnetic filters of commercial type may be employed for separating the precipitated metal, for example of the type disclosed in British specification No. 527,771 in which a magnetic field is set up in gaps lying in the fluid but out of the stream of flow thereof and the particles magnetically extracted are retained in the gaps, the said gaps having a transverse section of a few millimetres width so that the magnetic field is effective throughout the whole transverse section. In one form of this apparatus the pole pieces are united to form one or more mechanical units by supporting members and are juxtaposed to form a cylindrical surface interrupted by the said gap; the magnet assembly is situated in a cylindrical housing so arranged that the fluid is compelled to pass in front of each gap in the axial direction of the housing; and there are inlet and outlet pipes in the housing arranged to give this flow.

According to one form of procedure the total pressure on the reaction product to be treated according to the invention may be reduced, for example to 200 atmospheres, the cobalt precipitated with or without the aid of hydrogen, the cobalt metal separated from the liquid magnetically as described above, and the product subsequently hydrogenated, for example at a pressure of 150 atmospheres gauge. If the total pressure is reduced in this way, the temperature of the liquid during precipitation of the cobalt metal is also preferably lower. In general when operating at a lower pressure the temperature in the stripper is chosen so that substantially zero pressure of carbon monoxide is rapidly attained in the liquid.

The invention is of particular value in the separation of cobalt from the reaction product, largely consisting of aldehydes, obtained by subjecting olefines, particularly aliphatic monoolefines, in the liquid phase to the action of hydrogen and carbon monoxide under super-atmospheric pressure and at elevated temperature, for example in the presence of the cobalt salt of a fatty acid, for example acetate, or of cobalt naphthenate. In this reaction the crude products may contain, for example 0.1% by weight of cobalt and are removed from the reaction zone at a pressure of about 250 atmospheres gauge and at a temperature of not less than 150° C. While the partial pressure of the carbon monoxide may be reduced in various ways, for example, by reducing the total pressure, or by passing inert gases such as nitrogen, which, in order to prevent the formation of compounds that are non-magnetic or only weakly magnetic should be free from oxygen and carbon dioxide, through the liquid, it is preferred to operate at substantially constant total pressure and to reduce the partial pressure of carbon monoxide by passing substantially pure hydrogen through the liquid. It is preferred to operate above 150° C., for example at 150° to 170° C. when the pressure is of the order of 250 atmospheres, because below 150° C. the rate of decomposition of the soluble cobalt compound is too low to be practicably effective, and above 170° C. there is increasing danger of crotonization occurring. Under these conditions the bulk of the cobalt is precipitated in a form readily capable of separation by magnetic means. The liquid may then be passed upwardly through a separator (operating at a temperature of, for example 150° C. and a pressure of 250 atmospheres) in which are located a series of trays containing permanent magnets, the arrangement being such that, as the tower is ascended, there is an increasing number of magnets on the trays, or alternatively, the distance between the poles of the magnets decreases from tray to tray. If a very high degree of cobalt removal is required the liquid from the magnetic separator may subsequently be passed to a filter bed of known type or a ceramic filter. Pressures of e. g. 150–300 atmospheres are suitable.

One arrangement suitable for operating the process comprises a long tubular vessel in which is located a string, or strings, of cylindrical magnets threaded on a non-magnetic rod, for example the alloy sold in Great Britain under the registered trademark "Staybrite," each magnetic element being separated from its neighbours by a cylinder of non-magnetic material, for example brass and there being provided at suitable intervals on the rod spiders for locating it in the tubular vessel. The diameters of the vessel and the magnets are selected to give a suitable clearance, and the individual magnets are provided at each end with mild steel pole pieces having rounded edges. The vessel has an aluminium liner.

In operating the process by means of electromagnets, when a sufficient amount of the metal has become attached to the magnets, the liquid stream is stopped and the cobalt is removed from the magnets and washed with a suitable liquid. As a further feature of the invention, especially when permanent magnets are employed, the cobalt may be obtained in suitable catalytic form for re-use in the carbonylation process by treating the cobalt in the magnetic separating vessel with carbon monoxide (and, if desired with hydrogen in limited amounts) and an organic liquid, which may conveniently be one of the reactants or an inert solvent, and the resulting solution of carbonyl can be returned to the carbonylation reactor. The precipitation and separation of the ferro-magnetic metal may both be conducted in the same vessel, for example, by bubbling hydrogen through the liquid while contained in a vessel in which is distributed a suitable arrangement of magnets. This procedure has the advantages of simplicity and lower initial capital cost but it is, however, generally preferred on the ground of convenience and for facilitating frequent cleansing of the equipment, to conduct these operations in separate vessels. A very convenient method of conducting the process is to provide two magnetic separating vessels, and to switch from one to the other when it is desired to regenerate carbonyl.

Advantages of the process are the relatively small capacity of the vessel required for magnetic separation in contrast to vessels used for filtration previously, and the fact that, due to no filtering medium being present, there is a much lower pressure drop in the magnetic separation vessel than in the other type during the whole period of its use.

A further advantage when regeneration of the cobalt by means of carbon monoxide is carried out is that by suitable distribution of the magnetic fields the precipitated cobalt can be distributed more uniformly throughout the magnetic separator, which renders it readily and conveniently capable of regeneration by means of carbon monoxide and the organic liquid. This shows considerable advantage over methods of cobalt separation utilising a filter since in the latter the cobalt is highly segregated and its continuous regeneration in uniform concentration is rendered much more difficult.

Another advantage, particularly when employing hydrogen or an inert diluent to reduce the partial pressure of carbon monoxide is that the total pressure may be maintained, which is of considerable benefit in a continuous process. This particularly applies to carbonylation processes in which aldehydes are produced as intermediates for the production of other compounds, for example alcohols. In this particular process there is the additional advantage that the aldehydes are not exposed to atmospheric oxidation in the presence of cobalt, which is an oxidation promotion catalyst.

A still further advantage is that iron compounds resulting from attack by carbon monoxide of the steel equipment are reduced in substantial amount simultaneously with the cobalt and removed in the magnetic separator, thus reducing considerably the nuisance of deposition of iron in the preheating step preceding hydrogenation to alcohol.

Thus, for example, in the carbonylation of olefines to aldehydes and subsequent hydrogenation to alcohols a continuous process may be employed comprising in combination: carbonylation of olefine to aldehyde in the presence of a cobalt catalyst, treatment of the product with hydrogen at, for example, a pressure of 250 atmospheres gauge and a temperature of 150° C. to 170° C. to precipitate metallic cobalt, separation of precipitated metal from the liquid by means of a magnetic separator, mixing the product with superheated hydrogen and hydrogenating the product in the presence of a relatively mild hydrogenation catalyst, for example copper chromite, all of the operations being conducted at super-atmospheric pressure, for example of about 250 atmospheres gauge.

The invention is illustrated by the following example.

*Example*

The product obtained by carbonylation of di-isobutene in a continuous unit was separated in a catchpot at the reaction temperature (155° C.) and pressure (250 atmospheres) into gas and liquid. The latter, which contained approximately 0.1% by weight of cobalt in soluble form, was treated counter-currently with hydrogen gas, substantially free from $CO_2$ and $O_2$, also in a continuous unit, comprising an unpacked flooded tubular tower four feet in height by 1¼ inches diameter. A liquid feed rate of 3 litres per hour and a hydrogen rate of 450 litres per hour (measured at N. T. P.) were employed, the temperature being maintained at 155° C. by external electric heaters, and the total pressure at 250 atmospheres. This decomposed soluble cobalt compounds with the formation of a finely divided cobalt metal suspension.

The suspension was passed downflow through a further vertical high pressure tubular vessel in which twelve cylindrical permanent magnets of the sort already described, were arranged axially with suitable non-magnetic spacers between adjacent magnets. The magnets were provided with disc-shaped steel pole pieces such that the liquid was constrained to pass through a series of annular spaces between the pole pieces and the non-magnetic wall of the vessel (a thick aluminum liner fitted inside a high pressure steel forging). In all 24 such annuli, 2″ outside, 1¾″ inside, diameter were traversed in series, the assembly being completely flooded with product. Retention of cobalt under these conditions was 98% of that fed to the magnetic unit.

After 100 hours running the particles were found to be adhering to the magnetic units, 56% of the total retained being on the first magnet and the amount on each magnet descreasing to 1% on the last one. Typical size analyses of these deposits is shown on the following table:

| Position of magnet in string | Weight percentage of metal particles having a maximum dimension in microns less than— | | | | | | | | | |
|---|---|---|---|---|---|---|---|---|---|---|
| | 600 mic. | 420 mic. | 295 mic. | 210 mic. | 150 mic. | 104 mic. | 60 mic. | 30 mic. | 20 mic. | 10 mic. |
| Third magnet | 100 | 100 | 99.4 | 97.3 | 95.7 | 89.2 | 77.1 | 42.6 | 31.0 | 20.7 |
| Seventh magnet | 100 | 98 | | 96.3 | 94.2 | 89.3 | 73.2 | 42.5 | 30 | 17.5 |
| Twelfth magnet | 100 | 98 | | 96.2 | 93.8 | 91 | 78 | 41.3 | 26.2 | 9.7 |
| Mean size grading of all material retained | 100 | 98.9 | 98.4 | 96.7 | 96.0 | 89.7 | 75.6 | 43.0 | 35.0 | 18.8 |

A suitable form of magnet string comprising 12 magnets is shown in elevation in Figure 1 of the drawings, and the spider, used in it is shown in plan in Figure 2.

We claim:

In the carbonylation of olefinic compounds under elevated temperature and pressure with a mixed gas containing carbon monoxide and hydrogen in the liquid phase in the presence as a catalyst of a dissolved cobalt compound in which a liquid reaction product is obtained containing dissolved therein at least one compound selected from the group consisting of compounds of cobalt with carbon monoxide and compounds of cobalt with carbon monoxide and hydrogen and in which the said product is under a pressure of 150 to 300 atmospheres the improvement which comprises reducing the concentration of dissolved cobalt in the reaction product by decreasing the partial pressure of carbon monoxide thereon by passing a gas containing hydrogen through the liquid while maintaining it at 150–170° C. and at 150 to 300 atmospheres, whereby metallic cobalt is substantially completely precipitated in the form of small particles having a size less than 600 microns and separating the precipitated cobalt from the liquid reaction product containing the same by causing said liquid to flow while under a pressure of 150–300 atmospheres in a thin layer over magnetic surfaces distributed therein.

References Cited in the file of this patent

UNITED STATES PATENTS

| | | |
|---|---|---|
| 1,390,688 | Ellis | Sept. 13, 1921 |
| 1,759,661 | Muller et al. | May 20, 1930 |
| 2,264,756 | Johnston, Jr. | Dec. 2, 1941 |
| 2,358,612 | Acker | Sept. 19, 1944 |
| 2,497,303 | Gresham et al. | Feb. 14, 1950 |
| 2,504,682 | Harlan, Jr. | Apr. 18, 1950 |
| 2,508,666 | Frantz | May 23, 1950 |
| 2,508,743 | Bruner | May 23, 1950 |
| 2,596,920 | Smith et al. | May 13, 1952 |

FOREIGN PATENTS

| | | |
|---|---|---|
| 527,771 | Germany | Oct. 16, 1940 |